J. SADLER.
Tube Welding Machines.

No. 135,160. Patented Jan. 21, 1873.

Witnesses:
A. Benneckendorf
C. Sedgwick

Inventor:
J. Sadler
per
Munn & Co.
Attorneys.

UNITED STATES PATENT OFFICE.

JAMES SADLER, OF NEW YORK, N. Y.

IMPROVEMENT IN TUBE-WELDING MACHINES.

Specification forming part of Letters Patent No. 135,160, dated January 21, 1873.

*To all whom it may concern:*

Be it known that I, JAMES SADLER, of the city, county, and State of New York, have invented a new and useful Improvement in Tube-Welding Machine, of which the following is a specification:

This invention consists in a machine for facilitating the operation of welding tubes, more especially designed for the tubes of steam-boilers, which have failed at their ends and been reversed.

It is well known that such tubes before they can be replaced must have a piece of tubing soldered to one of the ends in order to make them of the desired length. This has been accomplished heretofore by the ordinary appliances of the common blacksmith's fire, a loose mandrel being used of sufficient diameter to nearly fill the tube. This mandrel abstracts too much heat from the tube, is difficult to handle, requiring two men to weld a tube, which operation is frequently done in a bungling and imperfect manner. With my apparatus one man only is required, and he alone can weld a tube in much less time and in a more perfect and workmanlike manner.

Figure 1:
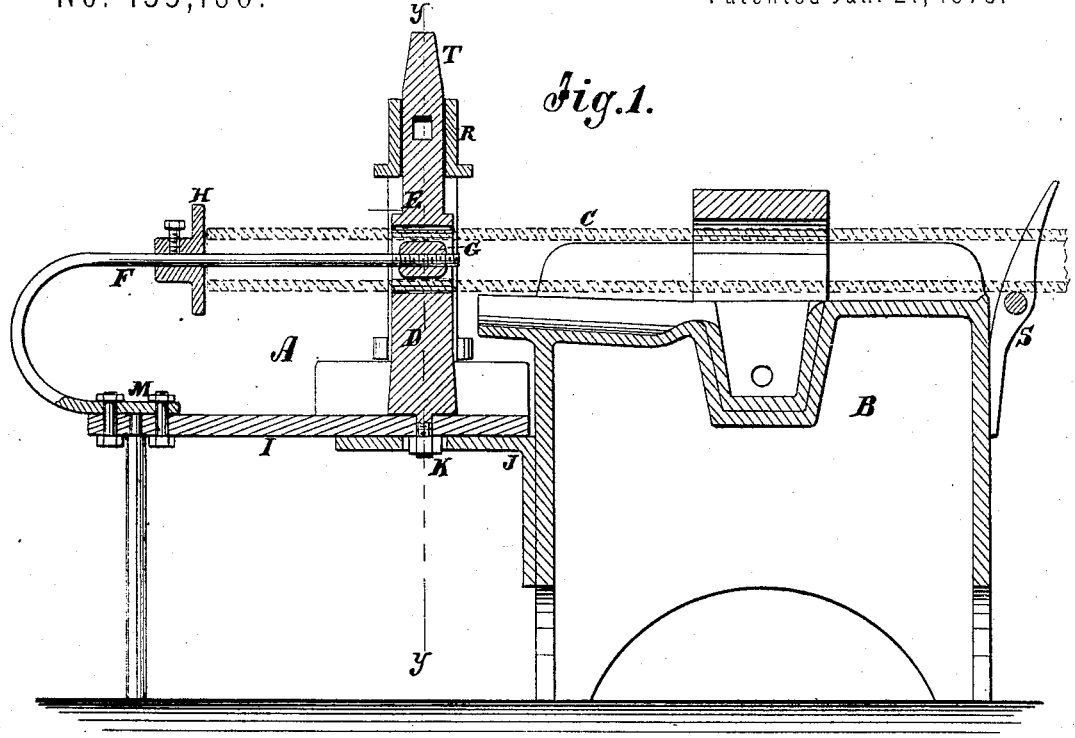
Figures 2, 3:
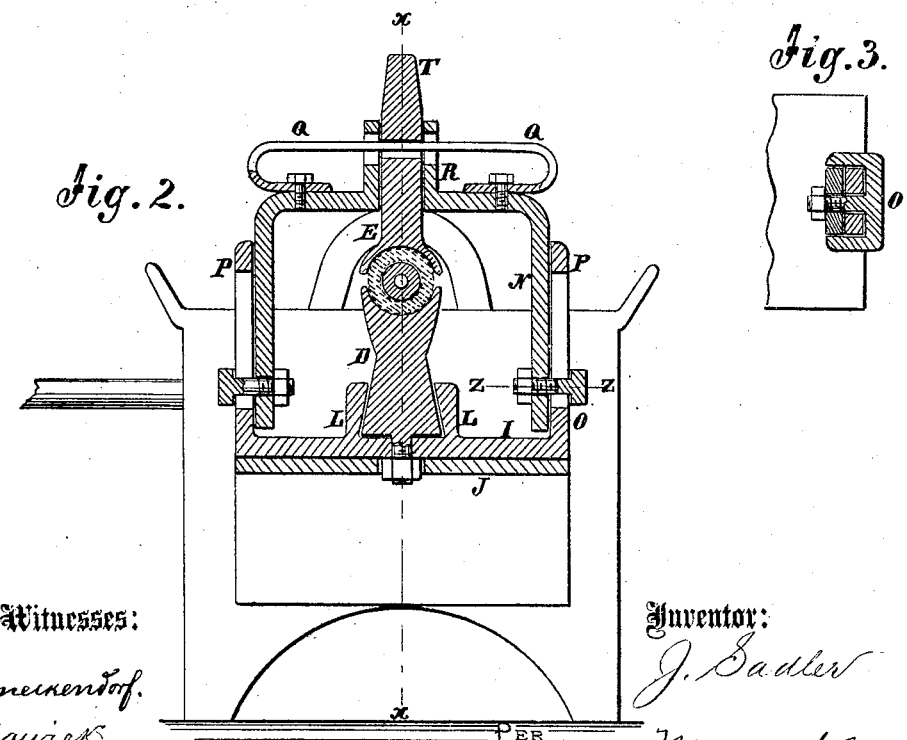

In the accompanying drawing, Figure 1 represents a vertical longitudinal section of my improved welding-machine attached to or connected with a properly-constructed forge, the section being on the line $x\ x$ of Fig. 2. Fig. 2 is a vertical cross-section of Fig. 1 taken on the line $y\ y$. Fig. 3 is a horizontal section taken on the line $z\ z$ of Fig. 2.

Similar letters of reference indicate corresponding parts.

H is the machine. B is the forge. C represents the tube. D is a removable bed-die. E is top or spring die. F is the mandrel-rod, and G is a ball arranged thereon. H is an adjustable gage to regulate the length of the tube and to keep the piece to be welded on in the right position. I is the bed-plate of the machine, which rests on the bracket J of the forge. The bed-die D rests on this plate and is confined thereon by the screw K and by the flanges L L. The mandrel-rod F is also attached to this plate by the bolts $m$, from whence it curves upward, so as to be parallel with the plate, and to correspond in height with the die, as seen in Fig. 1. The ball G is of iron, slipped on or formed on the rod, and is of about the diameter of the tube to be welded. The spring-die E is supported by the arch piece N, which is made adjustable as to height by means of clamp-screws O in the side ears P P of the bed-plate I. Q Q are springs, which pass through the socket R and enter mortise in the die. These springs are attached to the piece N, as seen in Fig. 2.

The tube to be welded is heated in the forge, resting on the bracket S of the forge and on the lower die. The end of the tube is expanded and the piece of tube being inserted previously. When a welding heat is obtained the tube and piece attached are slipped along to the die so that the ball G will be directly under the joint. The hammer is now applied to the shank T of the upper die with light quick blows while the tube is revolved with the other hand of the operator. The springs Q Q raise the upper die E from the tube slightly, so that the tube may be readily revolved.

The machine is constructed so that the dies may be changed to suit different-sized tubes.

Having thus described my invention, I claim as new and desire to secure by Letters Patent—

1. The tube-welding machine A, constructed substantially as shown and described.

2. The combination of the machine A with a forge, B, substantially as described, for the purposes set forth.

3. The adjustable supporting-arch N and springs Q Q, in combination with the die E, as and for the purposes described.

4. The adjustable gage H, in combination with the mandrel of a tube-welding machine, as and for the purposes described.

JAMES SADLER.

Witnesses:
T. B. MOSHER,
ALEX. F. ROBERTS.